Aug. 13, 1940.  A. E. PETERSON  2,211,217
INSIDE CONTROL HOOD LATCH KEEPER
Filed March 23, 1939  3 Sheets-Sheet 1
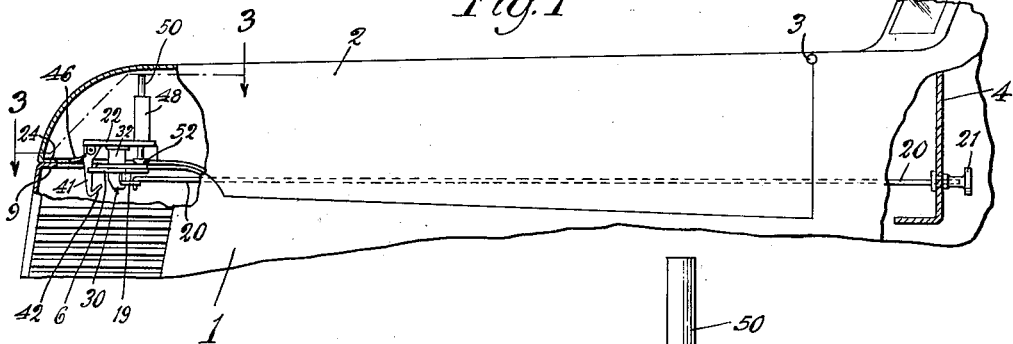
Inventor
Arthur E. Peterson
by Parker & Carter
Attorneys.

Aug. 13, 1940.  A. E. PETERSON  2,211,217
INSIDE CONTROL HOOD LATCH KEEPER
Filed March 23, 1939  3 Sheets-Sheet 2
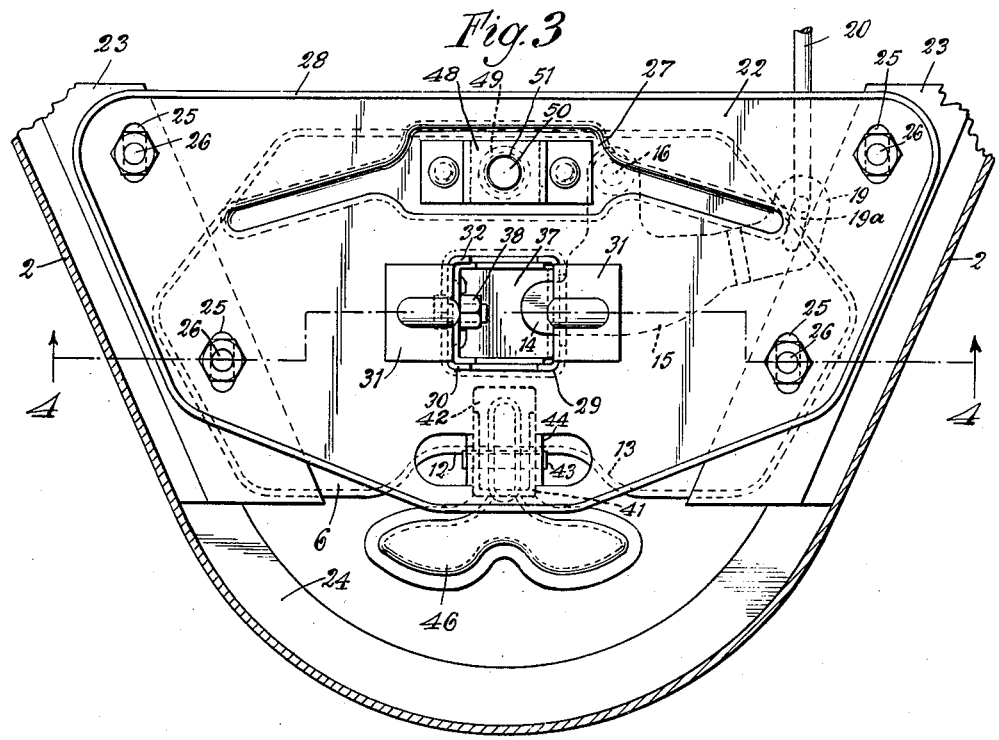
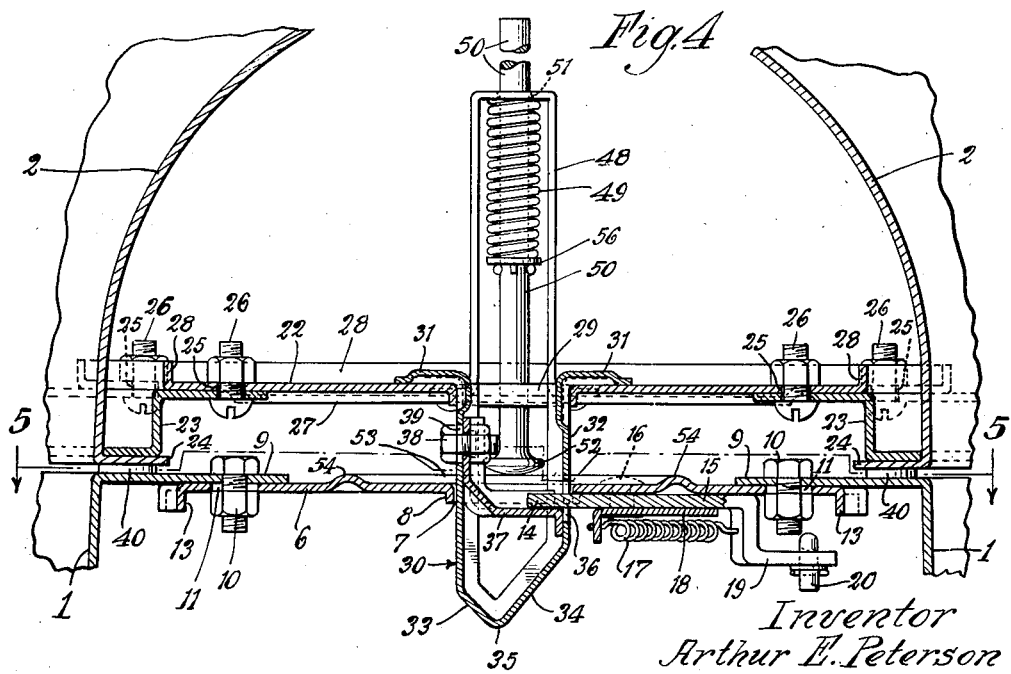
Inventor
Arthur E. Peterson
by Parker Carter
Attorneys.

Aug. 13, 1940.  A. E. PETERSON  2,211,217
INSIDE CONTROL HOOD LATCH KEEPER
Filed March 23, 1939   3 Sheets-Sheet 3
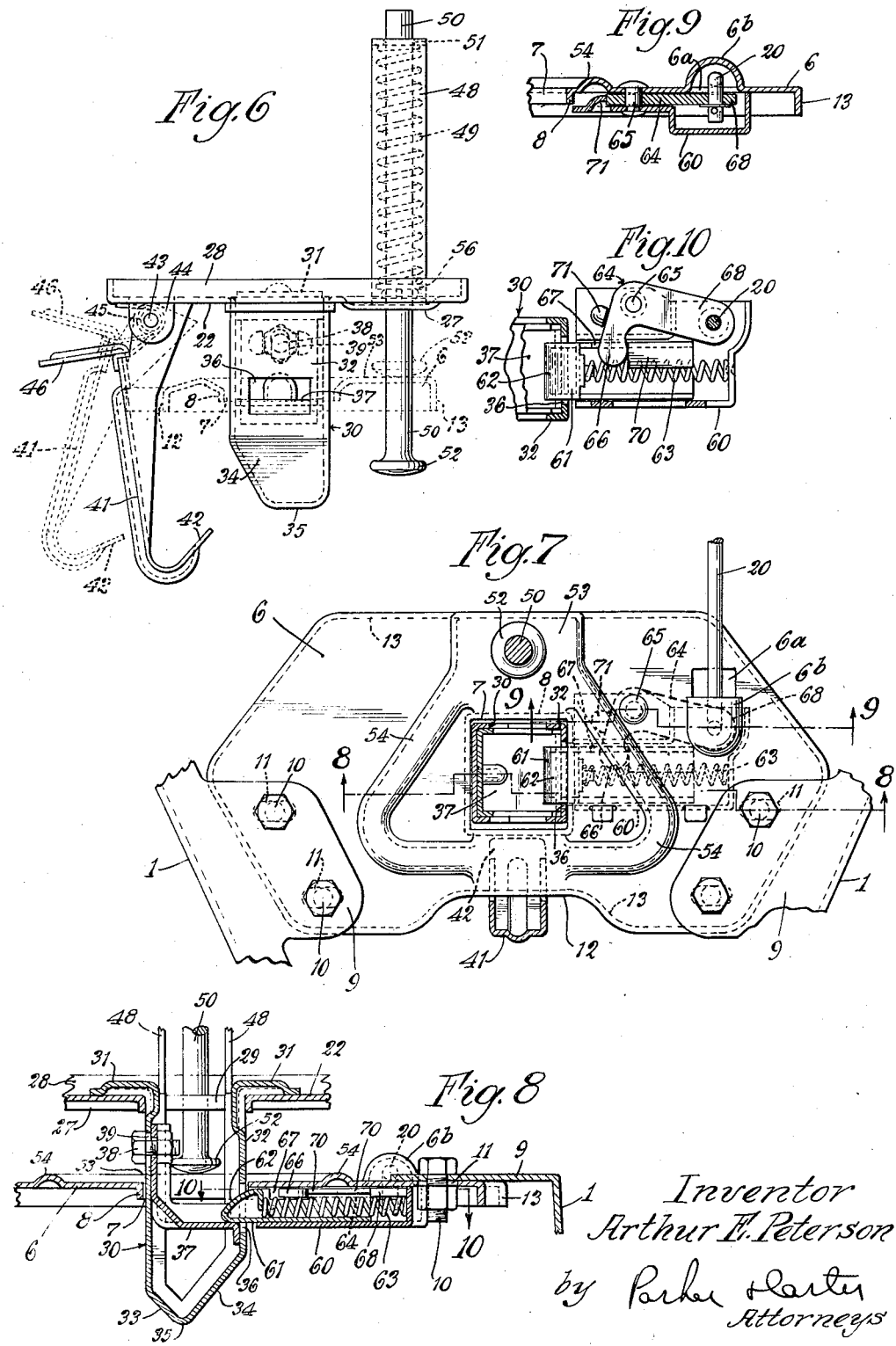

Patented Aug. 13, 1940

2,211,217

UNITED STATES PATENT OFFICE 2,211,217

INSIDE CONTROL HOOD LATCHKEEPER

Arthur E. Peterson, Chicago, Ill., assignor to Chicago Forging & Manufacturing Company, Chicago, Ill., a corporation of Illinois Application March 23, 1939, Serial No. 263,665

12 Claims. (Cl. 292—340)

My invention relates to an improvement in latches and has for one purpose the provision of an improved latch for the closure of an automobile hood.

Another purpose is the provision of a latch assembly which shall be compact, easy to manufacture, and efficient in use.

Another purpose is the provision of means unitarily applicable to an automobile hood and hood closure having primary latching means, secondary safety latching means, and means for lifting the hood closure a predetermined distance in response to the release of the primary latching means and prior to the release of the secondary safety latching means.

Other purposes will appear from time to time in the course of the specification and claims.

I illustrate my invention more or less diagrammatically in the accompanying drawings wherein:

Fig. 1 is a side elevation with parts in vertical longitudinal section;

Fig. 2 is a vertical longitudinal section on an enlarged scale illustrating part of the material shown in Fig. 1;

Fig. 3 is a section on the line 3—3 of Fig. 1;

Fig. 4 is a section on the line 4—4 of Fig. 3;

Fig. 5 is a section on the line 5—5 of Fig. 4;

Fig. 6 is a side elevation of a portion of the structure shown in Fig. 1 on an enlarged scale;

Fig. 7 is a view similar to Fig. 5 illustrating a variant form;

Fig. 8 is a section on the line 8—8 of Fig. 7;

Fig. 9 is a section on the line 9—9 of Fig. 7;

Fig. 10 is a section on the line 10—10 of Fig. 8.

Like parts are indicated bp like characters throughout the specification and drawings.

Referring to the drawings, and for example to Fig. 1 and following, I generally indicates an automobile hood and 2 a closure therefor, transversely and horizontally hinged at its rear end as at 3. It will be understood, however, that the hinge shown is diagrammatic and that any suitable mounting for the rear end of the closure 2 may be employed. 4 generally indicates the dashboard of the vehicle.

Mounted on the hood I is a member which I may call a bottom plate, generally indicated at 6 and shown in some detail for example in Fig. 5. It is illustrated as having an aperture 7 surrounded by a downwardly turned flange 8. The plate 6 may be mounted in any suitable fashion upon the hood 1. I illustrate for instance flanges 9 at each side of the hood 1 to which the plate 6 may be secured by bolts 10 or any other suitable securing means. Any suitable adjusting slots may be provided on the plate 6 as shown for example at 11 in Fig. 5. Preferably the plate 6 is mounted for lateral adjustment, the slots 11 being laterally or transversely elongated whereby the aperture 7 may be alined with latching means below described.

12 indicates any suitable abutment or securing lip provided with a downwardly turned flange 13 adapted to receive the secondary or safety latching member below described. The flange 13 it will be understood may extent entirely or substantially around the plate 6.

Mounted on the lower side of the plate 6 I illustrate a latch member 14 shown as formed of flat metal stock and mounted on or forming part of a lever 15 pivoted as at 16 for rotation about a vertical pivot and urged by a spring 17 toward latching position. 18 is any suitable retaining member for the lever 15 which may be secured at the bottom of the plate 6. 19 is a downwardly projecting lug on the end of the lever 15 which is adapted to receive any suitable operating element or rod 20 which terminates in any suitable operating element or rod 20 which terminates in any suitable operating handle member diagrammatically shown at 21 in Fig. 1. The member 21 may be mounted on or adjacent the dashboard or instrument panel of a vehicle in a position convenient to the driver's seat. Note that at the connection between 19 and 20 a slot 19a is shown in the lug 19 which is adapted to permit the member 14 to snap back out of locking position when the hood closure is dropped, wthout displacing the member 20 or the handle 21.

22 indicates a transversely extending plate mounted on the hood closure 2, for example upon intermediate brackets 23 secured upon the inturned lower edges or flanges 24 of the hood closure 2. It will be understood of course that any suitable securing and supporting means may be employed. I illustrate the member 22 as mounted for longitudinal adjustment, and for that purpose I provide adjusting slots 25 through which may pass any suitable securing bolts 26 whereby the member 22 is secured upon the upper, inner flanges of the brackets 23. The transversely extending member 22 is offset as at 27, which offset may serve as a reinforcing means but is not in general essential. It is also provided with a circumferential reinforcing flange 28, herein shown as upwardly extending.

Mounted on the plate 22 is a downwardly extending locking member generally indicated as 30. It includes top portions 31 engaging the top of the plate 22 and a body portion 32 extending downwardly through a corresponding aperture 29 in the member 22. The portion 32 is generally rectangular in cross-section and has bottom beveled portions 33 and 34 which converge on a relatively sharp transversely extending angle 35. The member 32 is further apertured in one side as at 36 to receive the member 14 in locking relationship. 37 indicates an inner insert adjustably located within the member 32 as by any suitable locking bolt and nut generally indicated at 38. One or both of the two members may be slotted as at 39 to permit the member 37 to be vertically adjusted within the member 32 in the proper relationship to the locking element 14. It will be noted that the shorter beveled face 33 serves properly to aline the member 32 within the aperture 7 of the lower plate 6.

It will be noted that the parts are so proportioned that the beveled portion 33 is effective to center the member 32 within the aperture 7 before the bevel 34 contacts the lock element 14. It is then effective, when the closure is dropped into position, to force the lock out against the action of the coil spring 17. As soon as the member 32 has descended to locking position, the spring 17 is then effective to return the locking member 14 into the position in which it is shown in Fig. 4, penetrating the aperture 36 and being positioned in locking relationship above the insert 37.

Any suitable pads or cushioning members of rubber or the like, as shown at 40, may be employed for cushioning the contact between the opposed portions of the hood 1 and the hood closure 2.

I provide a secondary or safety latching means which includes a lever or hook 41 with a latching or hook portion proper 42. The hook member is pivoted as at 43 between ears 44 which may be downwardly struck from the upper transverse plate 22. Any suitable means may be employed for urging the hook 42 normally into vertical alinement with the securing lip 12. I illustrate for example a coil spring 45. The hook is provided also with a finger or handle piece 46, which may be formed integrally therewith, the purpose of which will later appear.

Further mounted upon the top of the plate 22 and located adjacent the reinforcing 27 is the upwardly extending yoke 48. Mounted within it is the coil compression spring 49 through which passes the pin 50, the end of which extends upwardly through the aperture 51 in the upper end of the yoke or guide. The lower end of the pin 50 extends through the upper plate 22 and terminates in a laterally expanded head or contact member 52 which is adapted to engage any suitable portion of the lower plate 6. I illustrate for example a general reinforcing offset area 53 which also includes reinforcing ribs 54 whereby the entire plate 6 is to a substantial degree strengthened. The spring 49 is seated upon a fixed washer or abutment 56 on the pin 50, which also limits downward movement of the pin 50 when the closure 2 is opened.

Referring to Fig. 7, I illustrate a lock guide 60 in which is slidably mounted a locking or latch element 61 having a beveled forward end portion 62. A coil spring 63 normally urges it into the locking position in which it is shown in Fig. 8, with the locking end overlying the insert 37.

In order to release the latch 61 I provide a bell crank lever generally indicated as 64 and pivoted as at 65 between the lower face of the plate 6 and an upper face of the guide member 60. The bell crank lever is provided with a short arm 66 which penetrates a slot 67 in one side of the member 61 and is adapted, in response to the counterclockwise rotation of the bell crank lever, referring to its position in Figs. 7 and 10, to withdraw the member 61 against the thrust of the spring 63. Normally the short arm 66 is in engagement with an offset portion 70 of the latch element 61. A stop 71, indicated as a raised portion of the lock guide 60 limits movement of the bell crank lever 64 and the latch member 61 into locking position.

68 indicates a long arm of the bell crank lever which is engaged by the end of the rod 20. In order to provide for room for this engagement and for the operation of the above described structure, a portion of the plate 6 is apertured as at 6a and an adjacent portion is upwardly offset as at 6b. The rod 20 is shown as extending across the top of the plate 6 and as penetrating the offset portion or hood 6b.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

Referring for example to the form of Figs. 1 and following, I provide a compact, unitary structure for carrying a lock or latch which holds the closure 2 in final locked position, an additional latch 41 which permits a limited upward movement of the closure 2, and a spring 49 which, through the pin 50 and its head 52, tends yieldingly to lift the closure 2 to the upward limit of movement permitted by the hook portion 42 of the latch 41. Normally it need not raise the closure to the full limit of the latch 41, but if the closure 2 happens to be blown open during the movement of the car, the hook 42 positively limits the upward movement of the closure 2 unless the operator actually releases the member 41 for further movement.

The mail latch 14 cannot be actuated from the exterior of the hood except by actuation of the operating handle 21 inside the car itself. Assume that the operator wishes to give a filling station attendant access to the engine, he may pull on or otherwise actuate the handle 21, with the result that the latch 14 is withdrawn to released position. The spring 49 then lifts the closure 2 a distance which cannot exceed the full length of the hook 41, 42 but which in practice will be only a fraction of the possible lift. However, this lift is in practice sufficient to permit the operator to insert his fingers under the forward end of the hood closure 2 in order to complete the lifting of the closure.

The member 46 is conveniently located and conveniently shaped to receive the hand or fingers of the operator, so that the operator, by a single unitary upward lift, moves the hook 42 to release position, indicated in dotted line in Fig. 6, and lifts the closure 2 to any desired height. It will be understood that any suitable means may be employed, not herein shown, for holding the closure 2 in upward position when it once has been lifted.

In the operation of the device, the latch member 30 is guided into the hole 7 of the lower plate by the initial engagement with the edge of the hole or aperture of the smaller bevel 33. This is effective to guide the member 32 into the hole and thereafter the upper portion of the bevel 34 overrides the locking member 14 which is normally spring thrust into locking position. After the member 32 has overridden the member 14, the spring 17 thrusts it back into locking position, as shown in Fig. 4. In the form of Figs. 7 and following, the details of the latch are different, but the member 61 works the same way and is normally urged by the spring 63 into latching position. In order to provide a proper adjustment between the plates 6 and 22, one of them is mounted as above described for transverse adjustment and the other for longitudinal adjustment. The insert 37 is also vertically adjusted so as to provide adequate means for insuring a snug locking connection.

Normally the closure 2 is thus firmly locked. There is always a possibility however that the operator may not move the closure down quite far enough to obtain a complete locking effect. In this event, the latch hook 42 is effective since the spring 45 keeps it at all times in vertical alinement with that portion of the flange 13 which extends along the locking lip 12 of the plate 6. Thus, even if the hood closure 2 is lifted by the wind, it can only be lifted through an arc sufficient to cause the hook 42 to engage with the flange 13 and further unintended upward movement of the hood closure 2 is thus prevented.

I claim:

1. In locking means for an automobile hood having hingedly connected hood members and an apertured aligning plate and latch mounted on one of said members, a laterally apertured keeper mounted on the opposite hood member and adapted to penetrate the aperture of said plate, said aperture being adapted to receive said latch, said keeper being hollow and including a plurality of walls, one of said walls having therein said latch-admitting aperture, the outer end of said keeper being provided with a plurality of converging beveled portions of different length, one of said beveled portions being adapted to guide the keeper into the aperture of the plate, the other beveled portion being adapted thereafter to move said latch to inoperative position until it is aligned with the latch-admitting aperture of the keeper.

2. In locking means for an automobile hood having hingedly connected hood members and an apertured aligning plate and latch mounted on one of said members, a laterally apertured keeper mounted on the opposite hood member and adapted to penetrate the aperture of said plate, said aperture being adapted to receive said latch, said keeper being hollow and formed of sheet metal, one of the walls thereof having therein said latch-admitting aperture, said sheet metal walls being provided with a plurality of converging beveled portions of different length.

3. In locking means for an automobile hood having hingedly connected hood members and an apertured aligning plate and latch mounted on one of said members, a laterally apertured keeper mounted on the opposite hood member and adapted to penetrate the aperture of said plate, said aperture being adapted to receive said latch, said keeper being hollow and generally rectangular in cross section and formed of sheet metal, one of the walls thereof having therein said latch-admitting aperture, said metal walls being provided with a plurality of converging beveled portions of different length.

4. In locking means for an automobile hood having a fixed hood member and a hinged hood closure therefor, and an apertured aligning plate and latch mounted on the fixed hood member, a combined elongated keeper and centering member mounted on the hinged hood member and adapted to penetrate the aperture of said aligning plate, said member having an aperture adapted to receive said latch, said member comprising a plurality of abutting, generally rectilinear walls, said aperture being located intermediate the top and bottom of one of said walls.

5. In locking means for an automobile hood having a fixed hood member and a hinged hood closure therefor, and an apertured aligning plate and latch mounted on the fixed hood member, a combined, elongated keeper and centering member mounted on the hinged hood member and adapted to penetrate the aperture of said aligning plate, said member being hollow and having an aperture, intermediate top and bottom thereof, adapted to receive said latch.

6. In locking means for an automobile hood having a fixed hood member and a hinged hood closure therefor, and an apertured aligning plate and latch mounted on the fixed hood member, a combined, elongated keeper and centering member mounted on the hinged hood member and adapted to penetrate the aperture of said aligning plate, said member having an aperture adapted to receive said latch, said member comprising a plurality of abutting, generally rectilinear walls, said aperture being located intermediate the top and bottom of one of said walls, and an adjustable keeper seat mounted on said keeper and centering member and aligned with the aperture thereof.

7. In locking means for an automobile hood having a fixed hood member and a hinged hood closure therefor, and an apertured aligning plate and latch mounted on the fixed hood member, a combined, elongated keeper and centering member mounted on the hinged hood member and adapted to penetrate the aperture of said aligning plate, said member being hollow and having an aperture, intermediate top and bottom thereof, adapted to receive said latch, and an adjustable keeper seat mounted on said keeper and centering member and aligned with the aperture thereof.

8. In locking means for an automobile hood having a fixed hood member and a hinged hood closure therefor, and an apertured aligning plate and latch mounted on the fixed hood member, a combined elongated keeper and centering member mounted on the hinged hood member and adapted to penetrate the aperture of said aligning plate, said member having an aperture adapted to receive said latch, said member comprising a plurality of abutting, generally rectilinear walls, said aperture being located intermediate the top and bottom of one of said walls, and portions of said walls being inwardly beveled.

9. In locking means for an automobile hood having a fixed hood member and a hinged hood closure therefor, and an apertured aligning plate and latch mounted on the fixed hood member, a combined elongated keeper and centering member mounted on the hinged hood member and adapted to penetrate the aperture of said aligning plate, said member being hollow and having an aperture, intermediate top and bottom thereof, adapted to receive said latch, the end portion of said element being inwardly beveled.

10. In locking means for an automobile hood having a fixed hood member and a hinged hood closure therefor, and an apertured aligning plate and latch mounted on the fixed hood member, a combined elongated keeper and centering member mounted on the hinged hood member and adapted to penetrate the aperture of said aligning plate, said member having an aperture adapted to receive said latch, said member comprising a plurality of abutting, generally rectilinear walls, said aperture being located intermediate the top and bottom of one of said walls, one of said walls having an inclined end portion adapted to override the latch and move it laterally in response to the movement of the keeper and centering member toward latching position.

11. In locking means for an automobile hood having a fixed hood member and a hinged hood closure therefor, and an apertured aligning plate and latch mounted on the fixed hood member, a combined elongated keeper and centering member mounted on the hinged hood member and adapted to penetrate the aperture of said aligning plate, said member having an aperture adapted to receive said latch, said member comprising a plurality of abutting, generally rectilinear walls, said aperture being located intermediate the top and bottom of one of said walls, and a pair of diametrically opposite walls having end portions uniformly inwardly beveled.

12. In locking means for an automobile hood having a fixed hood member and a hinged hood closure therefor, and an apertured aligning plate and latch mounted on the fixed hood member, a combined elongated keeper and centering member mounted on the hinged hood member and adapted to penetrate the aperture of said aligning plate, said member having an aperture adapted to receive said latch, said member comprising a plurality of abutting, generally rectilinear walls, said aperture being located intermediate the top and bottom of one of said walls, and a pair of diametrically opposite walls having end portions uniformly inwardly beveled, the opposite pair of walls having end portions unequally beveled.

ARTHUR E. PETERSON.